United States Patent Office 3,537,328
Patented Nov. 3, 1970

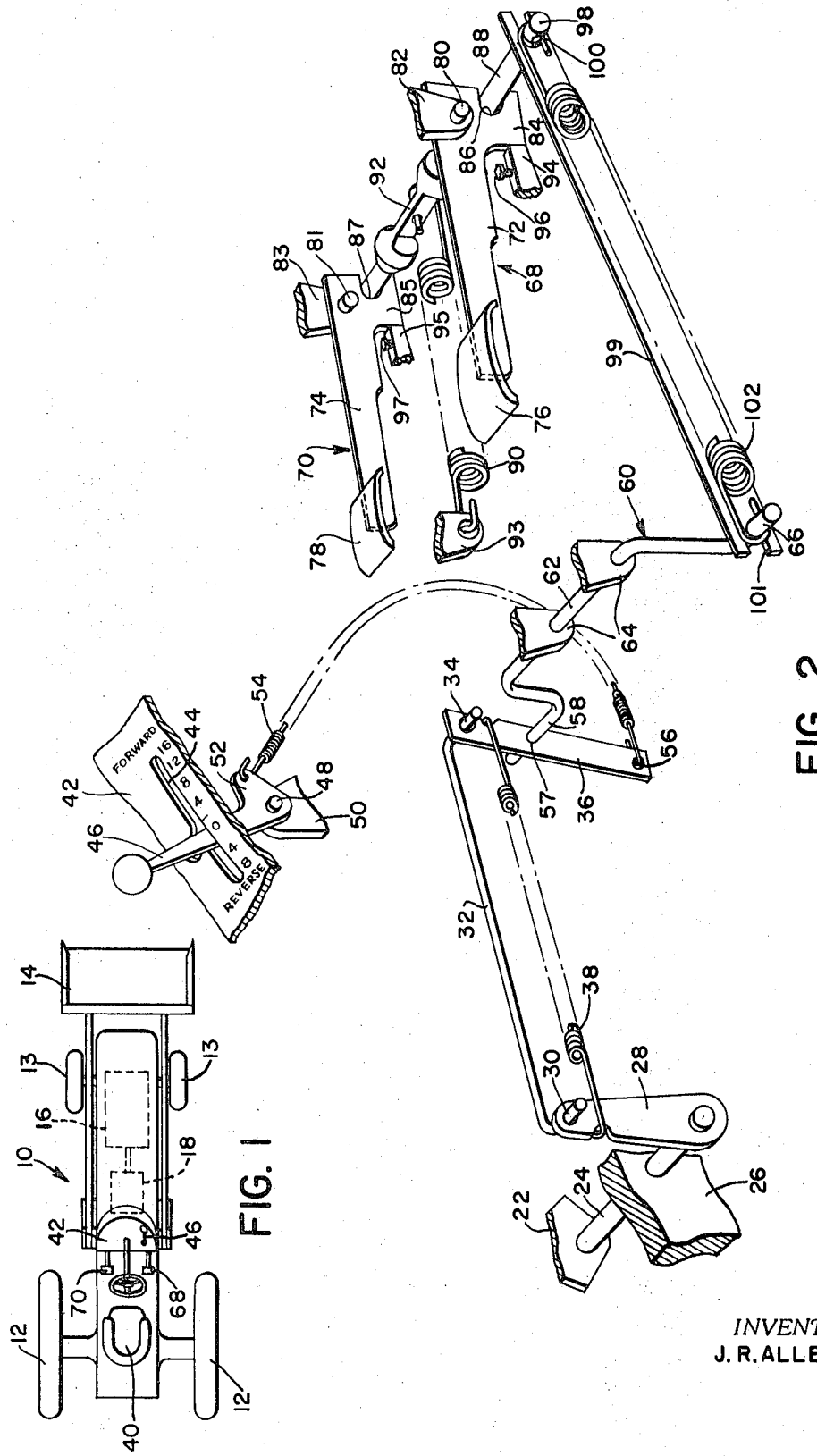

3,537,328
COMBINED HAND LEVER AND FOOT PEDALS FOR CONTROLLING VEHICLE SPEED AND DIRECTION
James Robert Allen, Cedar Falls, Iowa, assignor to Deere & Company, Moline, Ill., a corporation of Delaware
Filed May 28, 1969, Ser. No. 828,642
Int. Cl. G05g 11/00
U.S. Cl. 74—481
10 Claims

ABSTRACT OF THE DISCLOSURE

A tractor has an infinitely variable reversible transmission primarily controlled by a hand lever at the operator's station, which is connected to a transmission control element through a control mechanism to preselect the speed and direction of travel of the tractor. A pair of adjacent foot pedals at the operator's station are also connected to the control mechanism, so that depression of the alternate pedals moves the transmission control element in opposite directions from the preselected position. When the hand lever is positioned in neutral, depression of one pedal will actuate the transmission control element for forward movement of the tractor, while depression of the other pedal will result in rearward movement of the tractor, the speed of the tractor being proportional to the amount of depression of the respective pedals.

BACKGROUND OF THE INVENTION

This invention relates to transmission controls for tractors or the like, and more particularly to a transmission control system having both hand- and foot-operated control elements.

Conventionally, an agricultural or industrial tractor has one or more manually shiftable levers for controlling the ratio in the tractor transmission and the direction of travel of the tractor. Such an arrangement is generally satisfactory for most agricultural tractors and for many industrial tractors.

However, in some uses, the speed and direction of travel of the tractor is frequently changed during the operation of the tractor. Also, during such changes in the speed and direction of movement of the tractor, other functions of the tractor are simultaneously being changed. A prime example of such a use is a tractor equipped with a front end loader, wherein the tractor successively moves forwardly into a pile of material, rearwardly away from the pile, forwardly to the dump site, and then rearwardly away from the dump site. The above cycle is generally repeated for each load of material moved, and a large number of cycles are often necessary, so that the tractor is continually changing speeds and direction of travel. Also, during such changes in the transmission, the operator is generally steering the tractor and manipulating the controls for the loader. Thus, the additional manual shifting of the tractor strains the manual faculties of the operator.

However, it is known to provide pedals for controlling the transmission on such tractors, thereby freeing the hands of the operator to manipulate other controls.

SUMMARY OF THE INVENTION

According to the present invention, an improved control system is provided for controlling the output direction and ratio in a vehicle transmission, utilizing either a hand-operated control or a foot-operated control, or both of said controls together. More specifically, a control system for a tractor transmission is provided wherein the speed and direction of travel of the tractor can be established by a manually shiftable lever connected to the transmission through a control mechanism, so that the transmission ratio and output direction can be preselected according to the position of the manually-actuated lever, and a pair of alternately depressible pedals are so connected to the control mechanism that, when a zero speed is preselected by the manually-actuated control lever, increasing depression of one pedal increases the forward speed of the tractor, while increasing depression of the other pedal increases the reverse speed of the tractor. An important feature of the invention resides in the fact that the control pedals are operative to adjust the transmission ratio and speed when other than a zero speed is preselected by the hand lever, so that, for example, if a one mile an hour forward speed is preselected, depression of said one pedal increases the speed from one mile an hour forward, while depression of the other pedal first reduces the forward speed to zero mile an hour, with increasing depression of the pedal resulting in increasing reverse speed.

Another feature of the invention resides in the novel, simple, and durable construction of the mechanism connecting the foot pedals and the hand-operated control lever to the transmission. Still another feature of the invention resides in the provision of adjustable stops in association with the foot pedals to adjustably limit the depression of the pedals and thereby limit the forward and reverse speeds obtainable through depression of the pedals.

BRIEF DESCRIPTION OF THE DRAWINGS

FIG. 1 is a schematic plan view of a tractor provided with a front end loader and embodying the transmission control system.

FIG. 2 is a perspective, somewhat schematic view of a combined hand- and foot-operated transmission control system according to the invention.

DESCRIPTION OF THE PREFERRED EMBODIMENT

The invention is embodied in a tractor, indicated generally by the numeral 10 in FIG. 1 and including a pair of rearward drive wheels 12 and steerable front wheels 13. The tractor is equipped with a front end loader 14 and typically includes an internal combustion engine 16 which drives the wheels 12 through a transmission 18, both the engine and transmission being schematically illustrated in FIG. 1.

The transmission 18 can be any sort of transmission, although in the illustrated embodiment, the invention will be described in association with a hydrostatic transmission utilizing a single hydrostatic unit connected to the rear wheels by suitable reduction and differential gearing. The drive ratio in such a hydrostatic unit is conventionally infinitely variable and reversible to provide infinitely variable speeds in both forward and reverse directions. A common type of hydrostatic unit is the type utilizing axial piston pumps and motors, wherein the drive ratio and output direction is controlled by varying the swash plate of the pump. It is well known in the art to control the swash plate of such a reversible variable displacement pump by mechanical means including a cam, and in the illustrated embodiment, a cam-type transmission control element 22 is provided to control the drive ratio and output direction of the transmission 18. Of course, other types of transmission control elements, such as shiftable linkages or levers, could be provided for adjusting the swash plate of a variable displacement reversible pump in a hydrostatic transmission. Also, the transmission control element 22 could be associated with different types of transmissions. For example, the transmission could be of the type known as a dual path hydrostatic drive, wherein separate hydrostatic units are provided for the drive elements on opposite sides of the vehicle, the vehicle being steered by varying the output speed and direction of the respective hydrostatic units, such as is known in hydrostatic drive crawlers or windrower traction units. In such a drive, a transmission control element 22 would control the ratio in both the drives. As is apparent, the transmission control element could also be a shiftable element in mechanical-type transmissions, such as the known "power-shift" transmission or infinitely variable belt drive type transmissions.

The transmission control element 22 is rigidly mounted on a transverse shaft 24 journaled in a portion 26 of the tractor body, such as the transmission housing. Also rigidly mounted on the shaft 24 is an arm 28 having its upper end pivotally connected at 30 to the rearward end of a linkage rod 32. The forward end of the linkage rod 32 is pivotally connected at 34 to the upper end of a lever member 36. A tension spring 38 also extends between the upper ends of the lever member 36 and the arm 28 to reduce backlash in the system. It is to be understood, of course, that the words "forwardly" and "rearwardly" and other terms of orientation are with reference to a person facing in the direction of forward movement of the tractor (to the right in FIG. 1).

The tractor, as is conventional, has an operator's station 40, at the forward end of which is a control panel 42 provided with a slot-type shift quadrant 44, from which a manually actuated control member or shift lever 46 projects. The shift lever 46 is mounted on a pivot 48 carried by a portion 50 of the tractor body, and, as is apparent, the lever 46 is swingable in a fore-and-aft direction to infinitely variable positions along the shift quadrant, which is appropriately labeled with the tractor speeds in both forward and reverse, the lever 46 being shown in a neutral, or a zero ground-speed position in FIG. 2. The lower end of the shift lever has a forwardly extending arm 52, the forward end of which is connected to one end of a Bowden cable 54 having its other end connected at 56 to the lower end of the lever member 36, so that rocking of the shift lever 46 about its pivot 48 shifts the lower end of the lever member 36 in a fore-and-aft direction.

The lever member 36 is pivotally mounted at 57 between the connection points 34 and 56 to one offset end portion 58 of a crank shaft 60 having its central shaft portion 62 journaled in portions 64 of the tractor body. The crank shaft 60 has a second offset end portion 66 opposite the end portion 58 in general alignment with the end portion 58 and offset from the axis of rotation of the crank shaft 60.

Also located at the operator's station 40 below the control panel 42 are a pair of laterally adjacent similar pedals, indicated generally by the numerals 68 and 70. The pedals 68 and 70 respectively include generally fore-and-aft extending arms 72 and 74, with foot-receiving surfaces 76 and 78 at their rearward ends. The forward ends of the arms 72 and 74 are mounted on transverse pivots 80 and 81 respectively carried by portions 82 and 83 of the tractor body. Respectively depending from the forward end of the arms 72 and 74 are relatively short arms 84 and 85, the forward surfaces of which are provided with recesses or slots 86 and 87 respectively. As is apparent, the arms 84 and 72 of the pedals 68 and 85 and 74 of the pedal 70 form bell crank-like structures, whereby depression of the foot-receiving surfaces 76 and 78 causes forward movement of the recessed portion of the arms 84 and 85.

A transverse rod-like lever 88 is supported at transversely spaced points in the recesses 86 and 87, the lever 88 being biased rearwardly into engagement with the rearward end of the recesses 86 and 87 by a fore-and-aft tension spring 90 disposed between the pedals and operative between a central portion of the lever 92 and a portion 93 of the tractor body. The spring 90 transmits a rearward force on the arms 84 and 85 through the lever 88 biasing the respective pedals 68 and 70 into abutment with stops 94 and 95, which are rigidly connected to the tractor body and limit rearward movement of the respective arms 84 and 85 and consequently limit the upward movement of the respective pedals. The downward movement of the respective pedals 68 and 70 is limited by adjustable stops 96 and 97 respectively, here shown as bolt-like members threadable into the top of the stop elements 94 and 95 and engageable with the underside of the pedal arms 72 and 74.

The right end 98 of the lever 88, which is laterally spaced outwardly from the points of engagement of the lever 88 with the pedals 68 and 70 is connected to the offset end portion 66 of the crank shaft 60 by a generally fore-and-aft extending link member 99, which is provided with recesses 100 and 101 at its forward and rearward ends, the recesses respectively receiving the end 98 of the lever 88 and the end portion 66 of the crank shaft. A tension spring 102 operates between the lever 88 and the crank shaft end portion 66 to maintain the lever and the crank shaft end portion against the bottom of the recesses 100 and 101, thereby eliminating any backlash in the linkage.

In operation, when the shift lever 46 is in its neutral position and the pedals 68 and 70 are in their upper positions against the stops 94 and 95, as illustrated in FIG. 2, the mechanism which connects the shift lever and the control pedals to the transmission control element 22 positions the transmission control element so that it produces a neutral condition or a zero output speed in the transmission 18. If the operator moves the shift lever 46 upwardly and forwardly for forward movement of the tractor, the movement of the shift lever is transmitted to the lower end of the lever member 36 to move the lower end of the lever member rearwardly, rocking the lever member 36 about the central pivot connection 57, so that the upper end of the lever member moves forwardly to rock the transmission control element 22 in a clockwise direction, as viewed in FIG. 2. The clockwise rotation of the transmission control element 22 positions the transmission for a forward output, the greater the angular displacement from the neutral condition the greater the forward speed of the tractor.

Conversely, if the shift lever 46 is pulled rearwardly from the illustrated neutral condition, the lever member 36 is rocked in the opposite direction about the pivot connection 57, so that the transmission control element 22 is moved in counterclockwise direction from the illustrated position, again the greater the angular displacement from the neutral condition the greater the reverse output speed of the transmission.

When the shift lever 46 is placed in its neutral position, and if the operator desires to have his hands free for operations other than controlling the speed and direction of travel of the tractor, the foot pedals 68 and 70 can be used to control the transmission. For example, if the pedal 68 is depressed from the illustrated condition, the pedal arm 84 moves forwardly to move the right-hand end of the lever 88 forwardly, the lever 88 rocking about the point of connection of the lever arm with the other pedal 70, which functions as a fulcrum. The forward movement of the right end of the lever 88 is transmitted to the offset end portion 66 of the crank shaft 60 via the link member 99, so that the crank shaft 60 rotates in a counterclockwise direction about its central portion 62, causing the end portion 58 to also move forwardly. Since the lower end of the lever member 36 is fixed by the position of the shift lever 46, the forward movement of the offset end portion 58 of the crank shaft rocks the lever member 36 about its lower end, causing the upper end of the lever member 36 to move forwardly. The forward movement of the upper end of the lever member 36, as previously described, rocks the transmission control element 22 in a clockwise direction, so that the transmission 18 is adjusted to provide a forward output. As is apparent, the greater the depression of the pedal 68, the greater the angular displacement of the transmission control element 22 from its neutral condition, so that the forward speed of the tractor is proportional to the amount of depression of the pedal. The adjustable stop 96 limits the depression of the pedal 68 to limit the forward speed of the tractor obtainable through depression of the pedal 68.

Conversely, when the reverse pedal 70 is depressed, the left end of the lever 88 is moved forwardly, rocking the lever 88 about the point of connection of the lever 88 with the pedal 68, so that depression of the pedal 70 shifts the right end 98 of the lever 88 rearwardly. The rearward movement of the lever end 98, of course, rotates the crank shaft 60 in a clockwise direction, to rock the lever member 36 rearwardly about its lower end. The resulting rearward movement of the upper end of the lever member 36 rocks the transmission control element 22 in a counter clockwise direction to produce a rearward output direction of the transmission, the amount of angular displacement of the transmission control element and consequently the reverse speed of the transmission being proportional to the amount of the depression of the pedal 70. Again, the adjustable stop 97 is set to adjustably limit the maximum rearward speed obtainable through actuation of the pedal 70.

In the illustrated embodiment, the length of the lever 88 between the points of engagement with the two pedals is approximately twice the length of the lever 88 between its point of engagement with the pedal 68 and the link member 99, so that any given amount of forward movement of the left end of the lever 88 via depression of the reverse pedal 70 results in only approximately one half that amount of rearward movement of the right end of the lever 88 at its point of engagement with the linkage 99. However, for any given amount of forward movement of the lever 88 at its point of engagement with the pedal 68 pursuant to depression of the pedal 68, a greater amount of forward movement results in the right end of the lever 88 at the link member 99. Thus, for a given amount of pedal depression, depression of the forward pedal 68 will produce a substantially greater shift in the link member 99 and consequently in the transmission control element than when the reverse pedal 70 is depressed, so that a greater forward speed adjustment is obtainable through depression of the pedal than reverse speed. This feature is desirable as a safety factor, since the operator is generally better able to control the vehicle in a forward direction.

As is apparent, the operator can easily change the speed and direction of travel of the vehicle using only the pedals 68 and 70, thus freeing his hands to steer the tractor and operate the other controls, such as the controls for the front end loader 14.

In the above description of operation, the shift lever 46 is placed in its zero speed or neutral condition, so that operation of the pedals 68 and 70 respectively added or subtracted from said zero speed, to give forward and reverse speeds. However, other speeds can be selected with the shift lever and operation of the pedals 68 and 70 will respectively add and subtract from the preselected speed, the terms "add" and "subtract" being with reference to the net forward speed of the vehicle. For example, if a four mile per hour reverse speed or minus four miles per hour speed were preselected, depression of the forward pedal 68 would add to the net forward speed of the vehicle, or in other words, would decrease the reverse speed. Conversely, depression of the reverse pedal 70 would subtract from the net forward speed and if a negative net forward speed were preselected, such as four miles per hour reverse, depression of the pedal 70 would increase the rearward speed of the vehicle.

Thus, any speed of the tractor could be preselected with the shift lever 46 and adjustment to that speed could be accomplished by operation of the pedals 68 and 70. This feature could be very desirable during operation of the tractor as a loader, for example, wherein a relatively small forward speed could be preselected so that the tractor would constantly crowd the pile of material during the loading operation of the front end loader, making it unnecessary to operate the pedals 68 or 70 to obtain the crowding speed of the tractor. Of course, depression of the reverse pedal 70 would first reduce the forward speed to zero, and additional depression would then reverse the tractor, while initial depression of the forward pedal 68 would increase the forward speed of the tractor.

I claim:

1. In a vehicle having an operator's station, an engine, ground-engaging drive members, and transmission means adapted to drivingly connect the engine to the ground-engaging drive members to drive said members at variable speeds in forward or reverse directions and including an associated transmission control element shiftable into different positions to establish the different transmission output speeds and directions, the improvement comprising: a pair of depressible pedal means disposed at the operator's station; a manually actuatable control member disposed at the operator's station and shiftable into different positions to preselect the transmission output speed and direction; and a control means operatively interconnecting the manually actuatable control member, the pedal means, and the transmission control element to shift the transmission control element in response to shifting of the control member to preselect the position of the transmission control element and to shift the control element in one direction from the preselected position when one pedal means is depressed and in the opposite direction when the other pedal means is depressed.

2. The invention defined in claim 1 wherein the control means includes a lever member, a first linkage means connecting the manually shiftable control member to the lever member at a first point for shifting the lever member in response to shifting of the manually shiftable control member, a second linkage means connecting the pedal means to the lever member at a second point offset from the first point for shifting the lever member in opposite directions in response to depression of the alternate pedal means; and a third linkage means connecting the lever member to the transmission control element for shifting the control element in response to shifting of the lever member.

3. The invention defined in claim 2 wherein the third linkage means is connected to the lever member at a third point offset from the first and second points, so that the lever member rocks about the first point when the alternate pedal means are depressed and about the second point when the control member is shifted.

4. The invention defined in claim 2 wherein the first point is disposed at one end of the lever member, the third point is disposed at the other end of the lever member, and the second point is disposed intermediate the opposite ends of the lever member.

5. The invention defined in claim 3 wherein the second linkage means includes a link member, and means connecting the link member to one pedal means to shift the link member in one direction a certain distance for a given amount of depression of said one pedal means and connecting the link member to the other pedal means to shift the link member in the opposite direction a distance less than said certain distance for the same given amount of depression of the other pedal means.

6. The invention defined in claim 5 wherein said one pedal means is the forward pedal and the control means operatively connects said forward pedal to the transmission control element to increase the net forward speed of the vehicle in response to increasing depression of said forward pedal and the other pedal is the reverse pedal and the control means connects the reverse pedal to the transmission control element to increase the net reverse speed within increasing depression of said reverse pedal.

7. The invention defined in claim 6 wherein the means connecting the link member to the pedal means includes a lever having one end connected to the link member, and being engaged by the respective pedal means at spaced locations so that the lever is rockable about its point of engagement with the reverse pedal means when the forward pedal means is depressed to shift the link member in one direction and about its point of engagement with the forward pedal means when the reverse pedal means is depressed to shift the link member in its opposite direction.

8. In a vehicle having an operator's station, an engine, ground-engaging drive members, and transmission means adapted to drivingly connect the engine to the ground-engaging drive members to drive said members at variable speeds in forward or reverse directions and including an associated transmission control element shiftable into different positions to establish the different transmission output speeds and directions, the improvement comprising: a forward and a reverse depressible foot pedal means pivotally mounted side by side at the operator's station for rocking about an axis and including arm elements; stop means operatively associated with the respective pedal means to limit the upward movement of the pedal means about their pivot axis; a transversely extending lever connected to the respective arm elements at transversely spaced points on the lever and including an end portion laterally offset in the same direction from the points of connection with the arm elements, so that the end portion shifts in one direction when the forward foot pedal means is depressed to rock the lever about its point of connection with the reverse pedal means and shifts in the opposite direction when the reverse pedal means is depressed to rock the lever about its point of connection with the forward pedal means; and means connecting the lever end portion to the transmission control element to shift the transmission control element in opposite directions in response to shifting of the lever end portion in opposite directions.

9. The invention defined in claim 8 and including a manually actuatable control member disposed at the operator's station and shiftable into different positions to preselect the transmission output speed and direction and a means operatively connecting the manually actuatable control member and the transmission control element to shift the transmission control element in response to shifting of the control member to preselect the position of the transmission control element.

10. The invention defined in claim 9 wherein the means connecting the manually actuatable control member to the transmission control element and the end portion of the lever to the transmission control element comprises a control mechanism including a lever member, a first linkage means connecting the manually shiftable control member to the lever member at a first point for shifting the lever member in response to shifting of the control member, a second linkage means connecting the end portion of the lever to the lever member at a second point spaced from the first point for shifting the lever member in opposite directions in response to shifting of the lever end portion in opposite directions, and a third linkage means connecting the lever member to the transmission control element for shifting the control element in response to shifting of the lever member.

References Cited

UNITED STATES PATENTS

| | | | |
|---|---|---|---|
| 3,313,174 | 4/1967 | Walker et al. | 74—474 |
| 3,316,773 | 5/1967 | Findlay | 74—481 |

MILTON KAUFMAN, Primary Examiner

U.S. Cl. X.R.

74—474, 512